Sept. 29, 1959      C. E. SMITH      2,906,411
ATTACH-ON TRAY-SELF SUPPORTING SERVING TRAY
Filed March 21, 1955      3 Sheets-Sheet 1
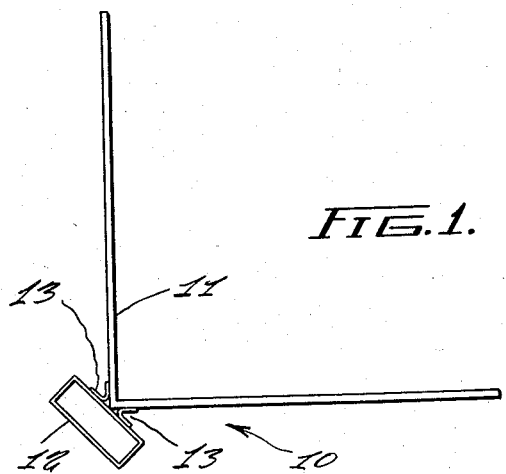
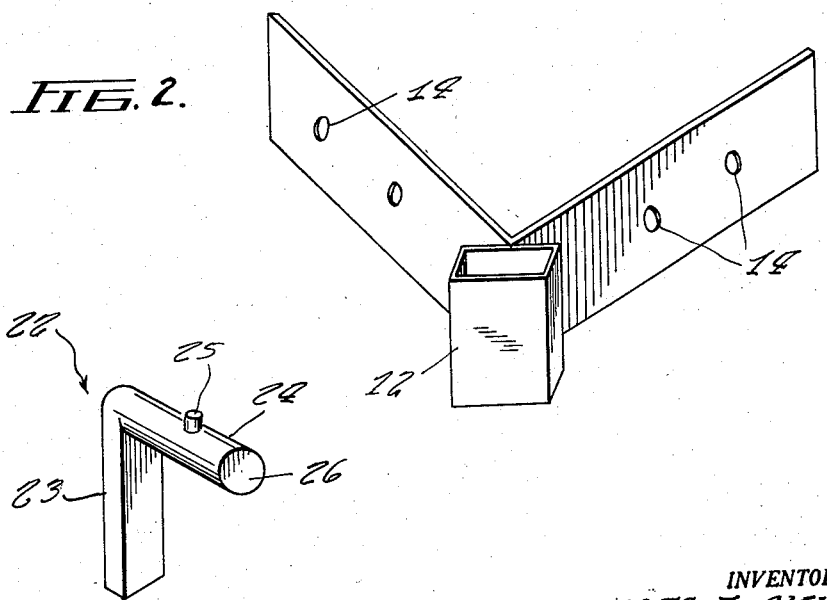
INVENTOR.
CHARLES E. SMITH
BY Carl Miller
ATTORNEY Sept. 29, 1959     C. E. SMITH     2,906,411
ATTACH-ON TRAY-SELF SUPPORTING SERVING TRAY
Filed March 21, 1955     3 Sheets-Sheet 2
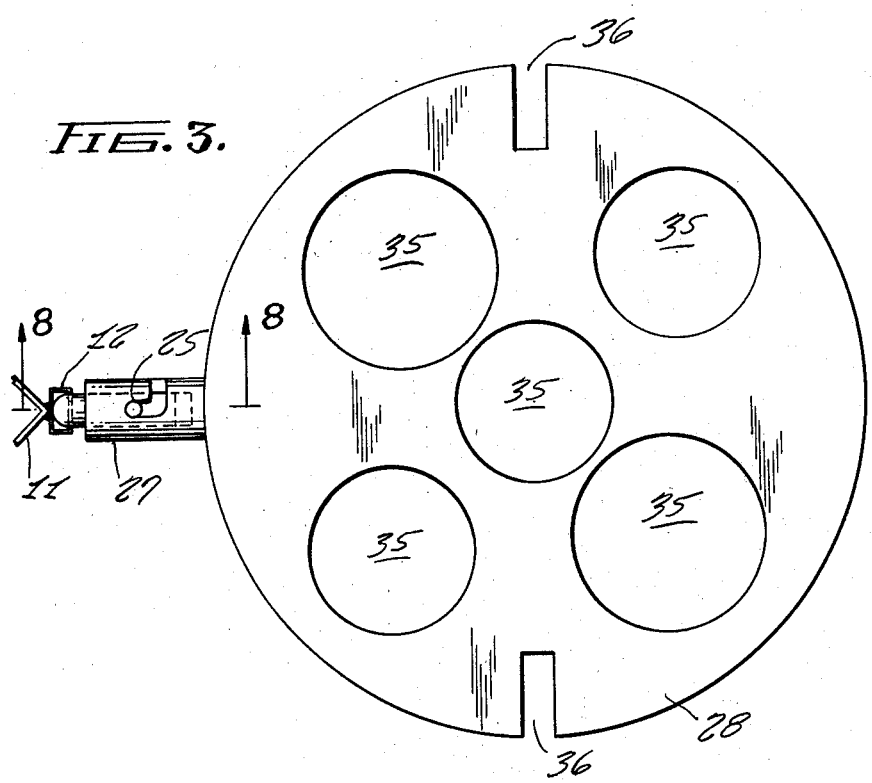
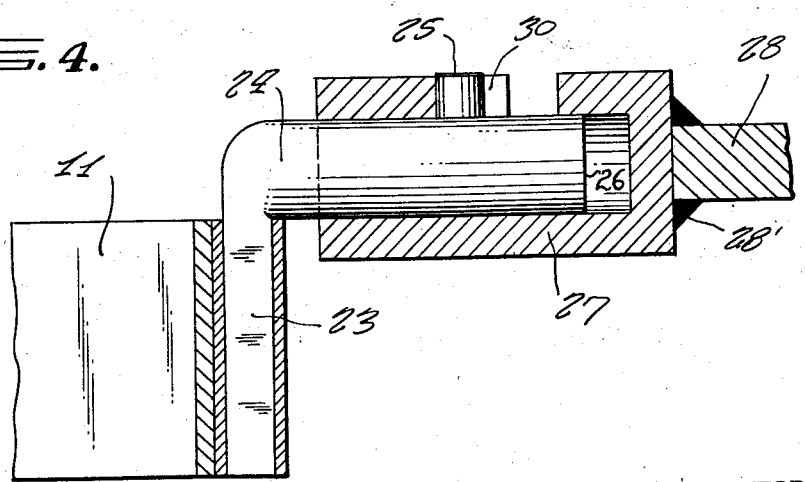
INVENTOR
CHARLES E. SMITH
BY Carl Miller
ATTORNEY Sept. 29, 1959          C. E. SMITH          2,906,411
ATTACH-ON TRAY-SELF SUPPORTING SERVING TRAY
Filed March 21, 1955          3 Sheets-Sheet 3
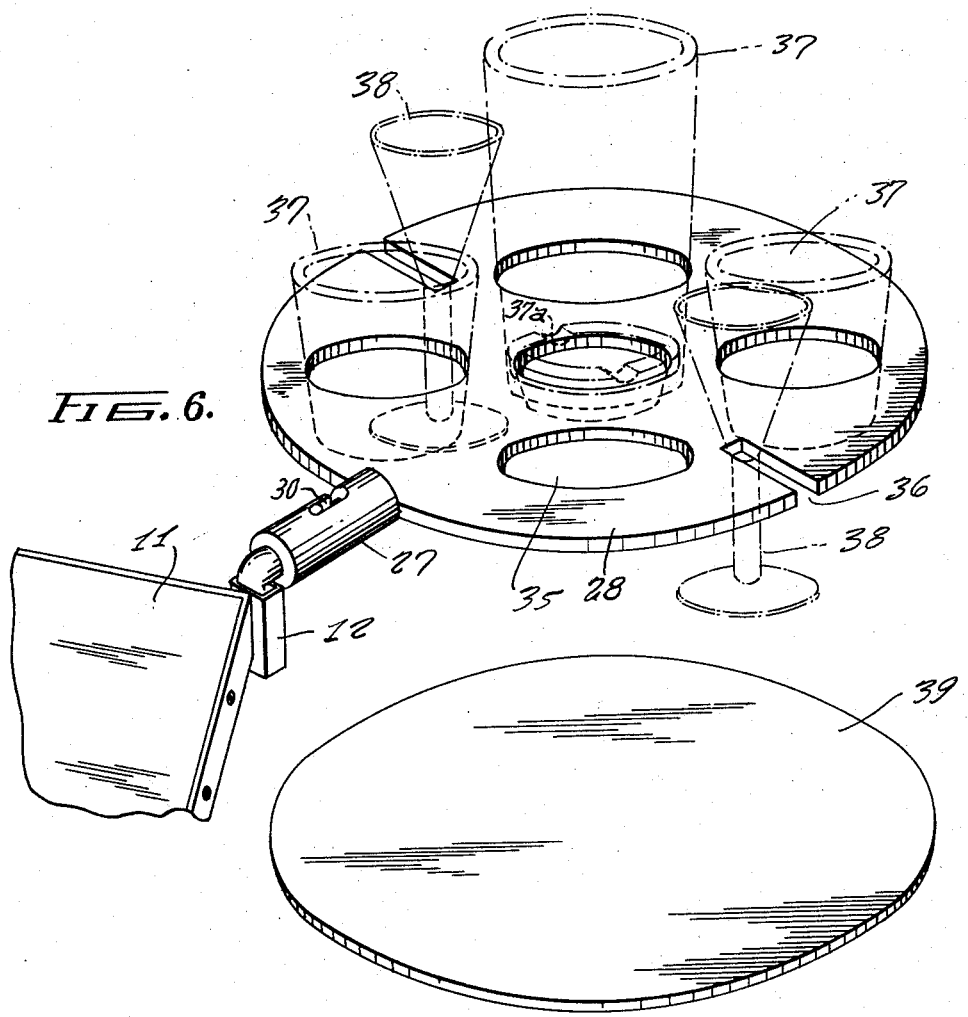
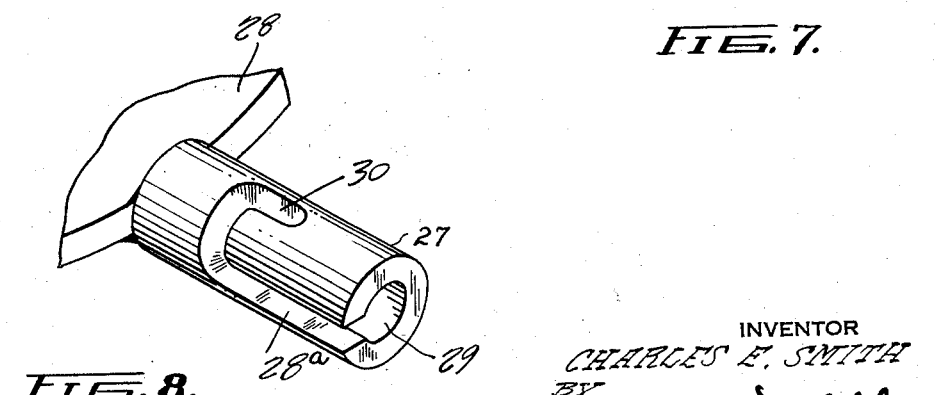
INVENTOR
CHARLES E. SMITH
BY
Carl Miller
ATTORNEY

2,906,411
ATTACH-ON TRAY—SELF SUPPORTING SERVING TRAY

Charles E. Smith, Bronx, N.Y.

Application March 21, 1955, Serial No. 495,497

4 Claims. (Cl. 211—71)

This invention relates to serving trays of the type generally used to serve beverages or food.

It is frequently of convenience to have available a tray which can be removably attached to various household furniture pieces, whereby the user can enjoy for example cocktails, coffee, snacks, in diverse locations. Thus, instead of having to balance a food or beverage laden tray on a hand or knee, the user is free to relax without concern as to the stability of the tray. For patients confined to bed, the provision of such a device is especially advantageous, since a person so confined is usually physically unable to balance a tray while eating.

In serving cocktails of various sorts, cups and glasses of different shapes are involved. Since the conventional flat tray does not provide a stable support for these objects, breakage frequently occurs. In the instant invention, a tray is provided which includes means for stably supporting drinking vessels of a varied assortment.

Consequently, it is the primary object of this invention to provide a serving tray especially adapted to stably support containers used for beverage dispensing and drinking purposes, which can be removably secured at convenient locations to various pieces of furniture such as tables, chairs, beds, etc.

A further object of this invention is the provision of means for removably mounting an object such as a tray on various pieces of furniture.

A still further object of this invention is the provision of a serving tray having means for securely and removably retaining vessels thereto which are used for drinking and dispensing purposes.

A more specific object of this invention is the provision of a serving tray especially adapted to retain removably thereon drinking vessels, such as cocktail glasses.

Further object and inventive details will become more apparent from the following detailed description, when read in conjunction with the appended drawings.

Figure 1 is a plan view of the corner of a table to which is secured a mounting bracket adapted to support the novel serving tray.

Figure 2 is a perspective view of the mounting bracket.

Figure 3 is a plan view of a tray and attachment accessories incorporating the instant invention.

Figure 4 is a sectional view thru plane 8—8 showing details of the method of attaching a tray to a piece of furniture.

Figure 5 is a perspective view of a yoke which is inserted in the mounting bracket to provide a support for the tray.

Figure 6 is a perspective view of a tray and attachment assembly in operative use, secured to a table corner.

Figure 7 is a perspective view of a tray used to carry shallow containers such as plates, bowls, etc.

Figure 8 is a perspective view of a fitting which projects integrally from a tray and which is used to secure the tray to a mounting bracket.

Referring now to Figures 1 and 2, a bracket assembly 10 is depicted which can be removably secured to the corner of a table for the purpose of providing a support for an especially equipped tray. The bracket assembly comprises an angle 11 to which is secured intgerally, by welding or the like, a rectangular socket 12 along the corner edge of the angle. A pair of skew clip angles 13 are provided along the rear face of the socket 12 for securing the socket to the angle 11. Holes 14 are formed thru the legs of angle 11 for the projection therethru of attachment means such as screws, nails, etc. used in attaching the bracket to a piece of furniture. The bracket 10 is obviously especially designed for use with rectangular tables, such as shown in Figure 6.

In Figure 5, there is depicted a yoke arm 22, which provides a convenient means for supporting the tray structure, as will be described. This yoke arm 22 comprises a rectangular leg 23, which is adapted to fit snugly within the socket 12, and a circular leg 24 at right angles to the leg 23. A peg 25 projects medially from the outer surface of the leg 24 spaced from the leg end 26.

The circular leg 24 is dimensioned to fit snugly within a tubular fitting 27 which projects laterally from a circular tray 28 (Figure 3). In Figure 8, this fitting 27 is better seen to include a slot 28a extending longitudinally from the outer end 29 to a point spaced from the tray 28 and thence continuing circumferentially to another longitudinal portion 30 which extends partially towards the end 29. Thus the tray can be securely but removably attached to the yoke leg 24 by inserting the leg 24 into the fitting 27 with the peg 25 aligned in the slots 28a until the peg 25 reaches the circumferential slot portion. By rotating the leg 24 within the fitting, the peg 25 is brought into alignment with the slot portion 30. A longitudinal movement of the peg 25 outwardly relative to the fitting securely locks the leg 24 within the fitting 27. In Figure 4, the snug sliding fit between yoke, the tubular fitting 27 and the socket 12 is better illustrated. Welding 28' or the like is used to secure the fitting 27 to the tray 28. The lateral projection of the peg 25 is equal to the radial thickness of the fitting, thus providing a maximum bearing surface between the peg 25 and the walls of the slot.

A serving tray 28 especially designed for carrying liquid containing and dispensing utensils is shown in Figure 3 to comprise a circular flat plate provided with a number of circular holes 35 of varying diameter. Along the periphery of the tray are provided radial slots 36 to accommodate the insertion of thin stemmed cocktail glasses. In Figure 6, an assortment of drinking vessels 37 including thin stemmed cocktail glasses 38 are shown resting securely in the holes 35 and the slots 36. Since the glasses flare upwardly, they are held at a point properly spaced from the base adjacent the center of gravity, thereby providing a greater measure of stability. There is also shown an inserted ash tray 37a.

Should the user desire to use the tray in connection with food, shallow utensils or, in general, objects not requiring retaining holes, a solid tray plate 39 of Figure 7 can be superimposed on the tray 28.

It is thus apparent that the instant invention provides an inexpensive tray equipped with accessories enabling the user to safely and removably secure the tray conveniently to diverse pieces of furniture and wherein the tray incorporates special retaining means for safely carrying drinking vessels or varied eating utensils.

Having thus described in detail the nature of the invention, a grant of Letters Patent is respectfully requested for the invention as defined by the following claims:

1. The combination of a serving tray and accessories for removably securing said tray to an article of furniture, said accessories comprising a tubular fitting projecting integrally from the tray, a bracket, means for mounting said bracket upon the article of furniture, said bracket defining a socket of rectangular cross section, said accessories further comprising a yoke arm having a leg of rectangular cross section and a leg of circular cross section connected at right angles relative to each other, said leg of rectangular cross section fitting snugly into said socket and said leg of circular cross section fitting snugly into said fitting, and a flat plate integral with said bracket having a pair of securement legs of substantially equal length perpendicularly connected to each other, both of said pair of securement legs defining openings for receiving fastening screws therethrough.

2. The combination as in claim 1, wherein the tray includes recesses for receiving drinking containers.

3. The combination as in claim 1, wherein the tubular fitting includes a slot, and the round leg has a peg which fits into the slot, said slot including means for retaining the peg therein.

4. The combination as in claim 1, wherein the tray is a flat unperforated circular plate.

References Cited in the file of this patent

UNITED STATES PATENTS

| Number | Name | Date |
|---|---|---|
| 205,291 | Neisser | June 25, 1878 |
| 260,216 | McFarlin | June 27, 1882 |
| 866,658 | Johnsen | Sept. 24, 1907 |
| 960,483 | Becker | June 7, 1910 |
| 962,220 | Hughes | June 21, 1910 |
| 1,262,471 | Eiland | Apr. 9, 1918 |
| 1,485,223 | Greene | Feb. 26, 1924 |
| 1,619,307 | Offenbach | Mar. 1, 1927 |
| 1,799,944 | Beardsley | Apr. 7, 1931 |
| 1,807,589 | Edmunds | June 2, 1931 |
| 2,820,305 | Farmer | Aug. 25, 1931 |
| 1,894,146 | Baker | Jan. 10, 1933 |
| 1,912,287 | Lundell | May 30, 1933 |
| 1,932,099 | Cabana | Oct. 24, 1933 |
| 2,080,865 | Lassiter | May 18, 1937 |
| 2,148,307 | Scott | Feb. 21, 1939 |
| 2,156,025 | Paul | Apr. 25, 1939 |
| 2,547,222 | Logan | Apr. 3, 1951 |
| 2,567,345 | Paljuk | Sept. 11, 1951 |
| 2,580,855 | Sloan | Jan. 1, 1952 |